United States Patent
Komata et al.

(10) Patent No.: US 10,153,152 B2
(45) Date of Patent: Dec. 11, 2018

(54) HIGH-PRESSURE SODIUM LAMP LIGHTING DEVICE

(71) Applicant: Iwasaki Electric Co., Ltd., Tokyo (JP)

(72) Inventors: Kouji Komata, Gyoda (JP); Hiroki Takahashi, Gyoda (JP); Takuya Shimomura, Gyoda (JP)

(73) Assignee: Iwasaki Electric Co., Ltd. (JP)

( * ) Notice: Subject to any disclaimer, the term of this patent is extended or adjusted under 35 U.S.C. 154(b) by 0 days.

(21) Appl. No.: 15/717,063

(22) Filed: Sep. 27, 2017

(65) Prior Publication Data

US 2018/0114689 A1 Apr. 26, 2018

(30) Foreign Application Priority Data

Oct. 20, 2016 (JP) .................................. 2016-206336

(51) Int. Cl.
*H05B 41/298* (2006.01)
*H05B 41/32* (2006.01)
*H01J 61/82* (2006.01)
*H01J 61/073* (2006.01)
(Continued)

(52) U.S. Cl.
CPC .......... *H01J 61/825* (2013.01); *H01J 61/073* (2013.01); *H01J 61/22* (2013.01); *H05B 41/24* (2013.01)

(58) Field of Classification Search
None
See application file for complete search history.

(56) References Cited

U.S. PATENT DOCUMENTS 5,569,984 A * 10/1996 Holtsag .................. H05B 37/02
315/307
2002/0017848 A1 2/2002 Minamihata et al.

FOREIGN PATENT DOCUMENTS

| CA | 2549270 A1 | 12/2006 |
| JP | S58209053 A | 12/1983 |
| JP | H9260072 A | 10/1997 |

(Continued)

OTHER PUBLICATIONS

Koshimura et al., Several Ways for Stabilizing HID Lamps Operation on High Frequency Power, 1983, J. Illum Engng. Inst. Jpn., vol. 67 No. 2, p. 55.*

(Continued)

*Primary Examiner* — Dedei K Hammond
(74) *Attorney, Agent, or Firm* — Lerner, David, Littenberg, Krumholz & Mentlik, LLP

(57) ABSTRACT

The present technology provides a high-pressure sodium lamp lighting device that reduces occurrence of the acoustic resonance phenomenon. A high-pressure sodium lamp lighting device of one aspect of the present invention comprises a high-pressure sodium lamp of arc length AL within the scope of 142.8 mm≤AL≤167 mm. The lighting device also includes an electronic ballast configured to supply a high frequency AC voltage to the high-pressure sodium lamp. A lighting frequency of the electronic ballast is a frequency that avoids a first and a second acoustic resonance occurrence bands f1 kHz and f2 kHz determined based on equations from an arc tube inner diameter D mm of the high-pressure sodium lamp. The equation for f1 is a range of f1min to f1max=(−7.4D+130) to (−8.3D+156). The equation for f2 is a range of f2 min to f2max=(−11.5D+200) to (−10.0D+197).

2 Claims, 8 Drawing Sheets

(51) Int. Cl.
    *H01J 61/22*     (2006.01)
    *H05B 41/24*     (2006.01)

(56) References Cited

FOREIGN PATENT DOCUMENTS

| | | |
|---|---|---|
| JP | H11162674 A | 6/1999 |
| JP | 2000311657 A | 11/2000 |
| JP | 2002110099 A | 4/2002 |
| JP | 2006339159 A | 12/2006 |

OTHER PUBLICATIONS

Murase et al., D2: A Study on Acoustic Resonance of DC Operating Short Arc Metal Halide Lamp, 1997, Proceedings of 30th National Conference of the Illuminating Engineering Institute of Japan, p. 89.*

Koshimura, et al., Several Ways for Stabilizing HID Lamps Operation on High Frequency Power, Journal of the Illuminating Engineering Institute of Japan, Jan. 1983, pp. 55-61, vol. 67, No. 2.

Musase, et al., A Study on Acoustic Resonance of DC operating short arc metal halide lamp, Proceedings of 30th National Conference of the Illuminating Engineering Institute of Japan, 1997, 2 pages.

\* cited by examiner

HIGH-PRESSURE SODIUM LAMP LIGHTING DEVICE

CROSS REFERENCE TO RELATED APPLICATIONS

The present application claims the benefit of and priority to JP Application No. 2016-206336, filed Oct. 20, 2016, the entire disclosure of which is incorporated by reference herein.

BACKGROUND

Technical Field

The present invention relates to a high-pressure sodium lamp lighting device. More specifically, the present invention relates to a high-pressure sodium lamp lighting device that reduces influence of an acoustic resonance phenomenon.

Related Art

A high-pressure sodium lamp is widely used as lighting for general lighting and plant growth.

It is known that an acoustic resonance phenomenon occurs in an arc tube when a high-pressure metal vapor discharge lamp including the high-pressure sodium lamp is lit with high frequency. When the acoustic resonance phenomenon occurs, arc discharge becomes disturbed inside the arc tube, illuminance decreases, and a lamp life becomes short.

The present inventors are aware of the following patent documents relating to the present invention.
JP 58-209053 A "HIGH-PRESSURE SODIUM DISCHARGE LAMP" (Publication Date: 1983 Dec. 5) Applicant: Rudolf Lamberts Adrian Van der Hayden
JP 9-260072 A "HIGH-PRESSURE DISCHARGE LAMP" (Publication Date: 1997 Oct. 3) Applicant: Matsushita Electric Industrial Co., Ltd.
JP 2006-339159 A "HIGH-PRESSURE LAMP, AND RELATED OPERATION METHOD AND RELATED SYSTEM FOR RESONATING HIGH-PRESSURE LAMP IN LONGITUDENAL MODE" (Publication Date: 2006 Dec. 14) Applicant: Patent-Treuhand-Gesellschaft fuer elektrische Gluehlampen mbH

SUMMARY

The number of cases adopting electronic ballast has increased also in high-pressure sodium lamps so that ballast and lighting equipment are integrated to be downsized. Therefore, there is a problem that an acoustic resonance phenomenon occurs in arc tubes.

Thus, an object of the present invention is to provide a high-pressure sodium lamp lighting device that reduces occurrence of the acoustic resonance phenomenon.

Considerating the above object, a high-pressure sodium lamp lighting device of one aspect of the present invention comprises: a high-pressure sodium lamp of arc length AL within the scope of 142.8 mm≤AL≤167 mm; and electronic ballast configured to supply a high frequency AC voltage to the high-pressure sodium lamp, a lighting frequency of the electronic ballast being a frequency that avoids a first and a second acoustic resonance occurrence bands f1 kHz and f2 kHz determined based on (Equation 1) and (Equation 2) from an arc tube inner diameter D mm of the high-pressure sodium lamp.

$$\text{First acoustic resonance occurrence band } f1: f1\min. \text{ to } f1\max.=(-7.4D+130) \text{ to } (-8.3D+156) \quad \text{(Eq. 1)}$$

Where D: arc tube inner diameter mm $$\text{Second acoustic resonance occurrence band } f2: f2\min. \text{ to } f2\max.=(-11.5D+200) \text{ to } (-10.D+197) \quad \text{(Eq. 2)}$$

Where D: arc tube inner diameter mm

Further, in the above high-pressure sodium lamp lighting device, the lighting frequency of the electronic ballast may be a value exceeding a maximum value of the second acoustic resonance occurrence band f2max. determined based on (Equation 2) from the arc tube inner diameter D mm of the high-pressure sodium lamp of lamp voltage–lighting frequency characteristics VL-f of the electronic ballast.

Further, a high-pressure sodium lamp lighting device of one aspect of the present invention comprises a high-pressure sodium lamp and electronic ballast configured to supply a high frequency AC voltage to the high-pressure sodium lamp; wherein said high-pressure sodium lamp is of arc length AL within the scope of 142.8 mm≤AL≤167 mm; a lighting frequency of said electronic ballast is a frequency that avoids a first and a second acoustic resonance occurrence bands f1 kHz and f2 kHz determined based on (Equation 1) and (Equation 2) from an arc tube inner diameter D mm of the high-pressure sodium lamp; and said electronic ballast has characteristics that a lighting frequency f [kHz] varies depending on the lamp voltage VL [V] with the electronic ballast, the lighting frequency of the electronic ballast is a value exceeding a maximum value of the second acoustic resonance occurrence band f2max. determined based on (Equation 2) from the arc tube inner diameter D mm of the high-pressure sodium lamp of lamp voltage–lighting frequency characteristics VL-f of the electronic ballast.

$$\text{First acoustic resonance occurrence band } f1: f1\min. \text{ to } f1\max.=(-7.4D+130) \text{ to } (-8.3D+156) \quad \text{(Eq. 1)}$$

Where D: arc tube inner diameter mm $$\text{Second acoustic resonance occurrence band } f2: f2\min. \text{ to } f2\max.=(-11.5D+200) \text{ to } (-10.D+197) \quad \text{(Eq. 2)}$$

Where D: arc tube inner diameter mm

Further, a method for reducing an acoustic resonance phenomenon of a high-pressure sodium lamp lighting device of one aspect of the present invention, the lamp being fed with a high frequency AC voltage from electronic ballast to be lit, comprises the following steps of: preparing a lamp of arc length AL within the scope of 142.8 mm≤AL≤167 mm, conforming to the electronic ballast; changing a lamp voltage VL when the lamp is lit to acquire lighting frequency characteristics VL-f of the electronic ballast; acquiring a range of an arc tube inner diameter with which a lighting frequency of the electronic ballast does not fall within a range of a first and a second acoustic resonance frequency bands f1 kHz and f2 kHz by using (Equation 1) and (Equation 2); and creating an arc tube within a range of an acquired arc tube inner diameter to accomplish the high-pressure sodium lamp lighting device.

$$\text{First acoustic resonance occurrence band } f1: f1\min. \text{ to } f1\max.=(-7.4D+130) \text{ to } (-8.3D+156) \quad \text{(Eq. 1)}$$

Where D: arc tube inner diameter mm

Second acoustic resonance occurrence band $f2$: $f2$
min. to $f2\max.=(-11.5D+200)$ to $(-10.D+197)$  (Eq. 2)

Where D: arc tube inner diameter mm

Further, in the above method for reducing an acoustic resonance phenomenon of a high-pressure sodium lamp lighting device, further comprises: provisionally determining an initial lamp voltage from the lamp voltage–lighting frequency characteristics VL-f to determine an initial lighting frequency of the electronic ballast, acquiring a range of an arc tube inner diameter with which the initial lighting frequency does not fall within a range of a first and a second acoustic resonance occurrence bands f1 kHz and f2 kHz by using (Equation 1) and (Equation 2), and creating a lamp having a lamp voltage VL with a lighting frequency higher than a second acoustic resonance occurrence band maximum value f2max. with an inner diameter within a range of an acquired arc tube inner diameter to accomplish the high-pressure sodium lamp lighting device.

Further, a method for reducing an acoustic resonance phenomenon of a high-pressure sodium lamp lighting device of one aspect of the present invention, the lamp being fed with a high frequency AC voltage from electronic ballast to be lit, the method comprises the steps of: preparing a lamp of arc length AL within the scope of 142.8 mm≤AL≤167 mm, conforming to the electronic ballast; changing a lamp voltage VL when the lamp is lit to acquire lighting frequency characteristics VL-f of the electronic ballast, the electronic ballast having characteristics that a lighting frequency f [kHz] varies depending on the lamp voltage; provisionally determining an initial lamp voltage from the lamp voltage–lighting frequency characteristics VL-f to determine an initial lighting frequency of the electronic ballast, acquiring a range of an arc tube inner diameter with which the initial lighting frequency does not fall within a range of a first and a second acoustic resonance occurrence bands f1 kHz and f2 kHz by using (Equation 1) and (Equation 2), and creating a lamp having a lamp voltage VL with a lighting frequency higher than a second acoustic resonance occurrence band maximum value f2max. with an inner diameter within a range of an acquired arc tube inner diameter to accomplish the high-pressure sodium lamp lighting device.

First acoustic resonance occurrence band $f1$: $f1$min.
to $f1\max.=(-7.4D+130)$ to $(-8.3D+156)$  (Eq. 1)

Where D: arc tube inner diameter mm

Second acoustic resonance occurrence band $f2$: $f2$
min. to $f2\max.=(-11.5D+200)$ to $(-10.D+197)$  (Eq. 2)

Where D: arc tube inner diameter mm

DETAILED DESCRIPTION

In the following, embodiments of a high-pressure sodium lamp lighting device according to the present invention will be described in detail with reference to accompanying drawings. It should be noted that in the figures, the same elements will be denoted by the same numerals, and an overlapping description will be omitted.

[Acoustic Resonance Phenomenon]

An "acoustic resonance phenomenon" in a high-pressure sodium lamp lighting device is a phenomenon occurring in the state of AC high-frequency lighting. Electrodes in an arc tube are repeatedly energized and shut off at high speed because of high frequency lighting. During the energization, the electrode is heated to a high temperature, and during the shut-off, heating is interrupted although shortly. As a result, gas near the electrode is heated and interrupted in heating, and a pressure wave including compressional waves of large and small pressure is generated. The pressure wave propagates away from the electrode at acoustic velocity. Since this phenomenon is the same phenomenon as sound propagation, this phenomenon is called the acoustic resonance phenomenon. This acoustic resonance phenomenon is a phenomenon that always occurs in a mercury lamp, a metal halide lamp, and a high-pressure sodium lamp.

When this acoustic resonance phenomenon matches the lighting resonance frequency of the arc tube of a lamp, a standing wave is generated, a discharge arc flickers or is interrupted, or the direction of the arc is bent to be directed to an arc tube wall surface, which may lead to arc tube rupture.

The acoustic resonance phenomenon of the lamp does not occur at the commercial frequency of 50 or 60 Hz because the frequency is low, and occurs at the high frequency lighting frequency of the lamp of several kHz to 100 kHz.

It should be noted that as far as the inventors know, there has been no invention, proposal or the like concerning a relationship between the acoustic resonance phenomenon and an arc tube inner diameter D described in the first embodiment.

First Embodiment

Figure 1:
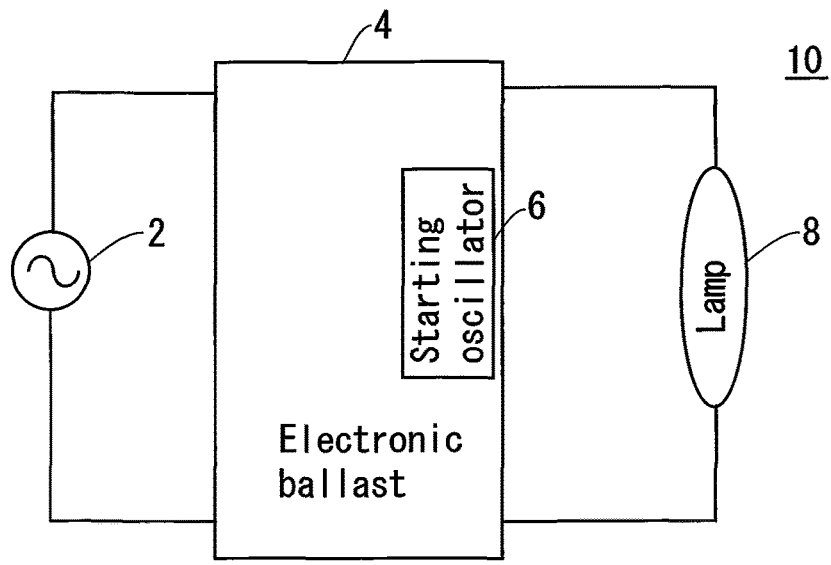
FIG. 1 is a circuit block diagram of a high-pressure sodium lamp lighting device according to the present embodiment.

FIG. 1 is a circuit block diagram of a high-pressure sodium lamp lighting device 10 according to the present embodiment. Power is supplied from an AC power supply 2 to a high-pressure sodium lamp 8 through electronic ballast 4. A starting oscillator 6 is built in the electronic ballast 4 and applies a high voltage pulse to the lamp 10 only at the time of starting.

First, the present inventors investigated cause of occurrence of an acoustic resonance phenomenon in a high-pressure sodium lamp lighting device. As occurrence factors of the acoustic resonance phenomenon, a charged pressure of xenon Xe sealed in an arc tube, an arc length (distance between electrodes) AL, an electrode type, and the like were considered.

Figure 2A:
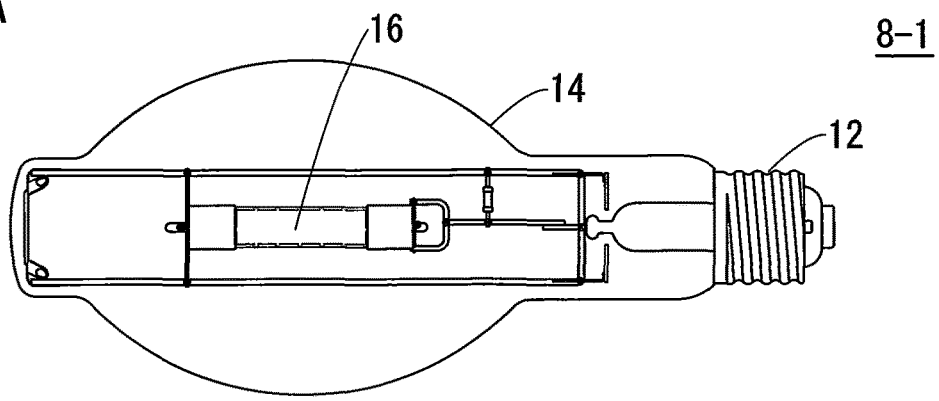
FIG. 2A is an example of a high-pressure sodium lamp.
Figure 2B:
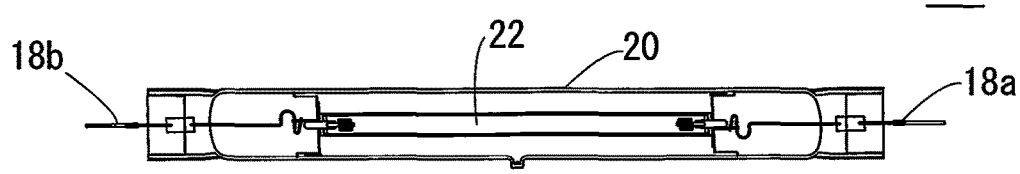
FIG. 2B is another example of the high-pressure sodium lamp.

FIGS. 2A and 2B show an example of shapes of high-pressure sodium lamps. In FIG. 2A, power is supplied from a base 12 formed at one end, a tube bulb 14 has a bulb shape, and an arc tube 16 is accommodated therein. In FIG. 2B, power is supplied from both ends 18a and 18b, a tube bulb 20 has a T-tube type, and the arc tube 22 is accommodated therein. It should be noted that the shape of the high-pressure sodium lamp is not limited to these, and includes all shapes.

Both of the arc tube 16 and 22 has a cylindrical shape as a whole in which an axis center extends linearly except that electrodes are attached to both end faces, and therefore, its inner diameter is almost the same over the entire length of the arc tube.

Figure 3A:
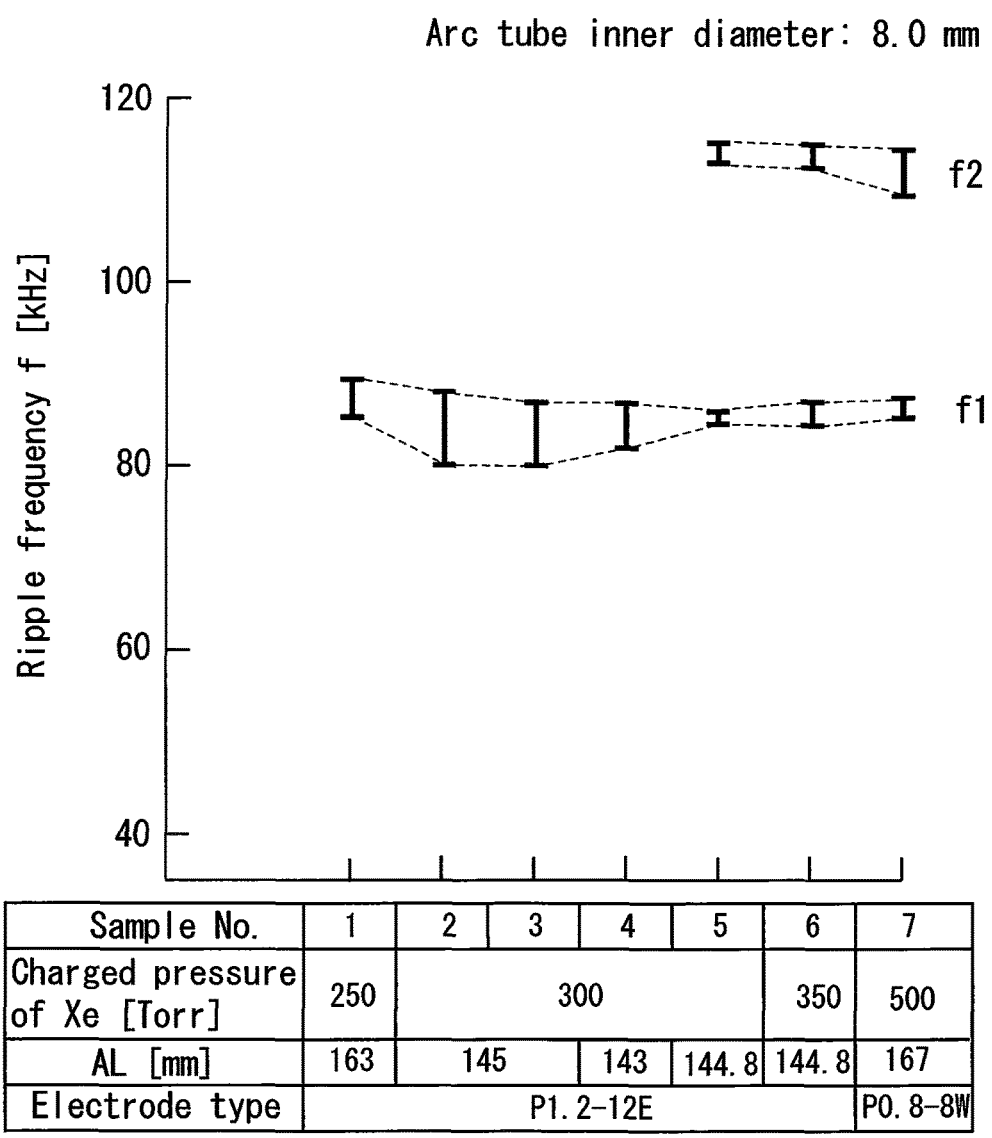
FIG. 3A is a graph showing a relationship between various kinds of parameters and a ripple frequency of the high-pressure sodium lamp using an arc tube inner diameter 8.0 mm.

FIG. 3A relates to a high-pressure sodium lamp with an arc tube inner diameter D=8.0 mm, and shows a result of preparing seven samples by using the charged pressure of Xe Torr, the arc length AL mm, and the electrode type of the arc tube as the parameters to measure a ripple frequency kHz at which the acoustic resonance phenomenon occurs. It should be noted that presence or absence of the occurrence of the acoustic resonance phenomenon is determined visually by presence or absence of swing/bending deformation of the arc inside the arc tube.

Regarding the charged pressure of Xe, a sample No. 1 has 250 Torr, Nos. 2 to 5 have 300 Torr, No. 6 has 350 Torr, and No. 7 has 500 Torr. Regarding the arc length AL, the sample No. 1 has 163 mm, Nos. 2 to 3 have 145 mm, No. 4 has 143 mm, Nos. 5 to 6 have 144.8 mm, and No. 7 has 167 mm. Regarding the electrode type, the samples Nos. 1 to 6 have P1.2-12E (electrode mandrel diameter 1.2 mm, total length 12 mm), and No. 7 has P0.8-8 W (electrode mandrel diameter 0.8 mm, total length 8 mm).

Based on the experimental results, it was found that a first acoustic resonance frequency f1 kHz occurs at 80 to 90 kHz with the arc tube inner diameter D=8.0 mm. Similarly, it was found that a second acoustic resonance frequency f2 kHz occurs at 110 to 120 kHz. It should be noted that although it was expected that a third acoustic resonance frequency is also generated, a phenomenon that affects the arc in the arc tube was not observed.

Figure 3B:
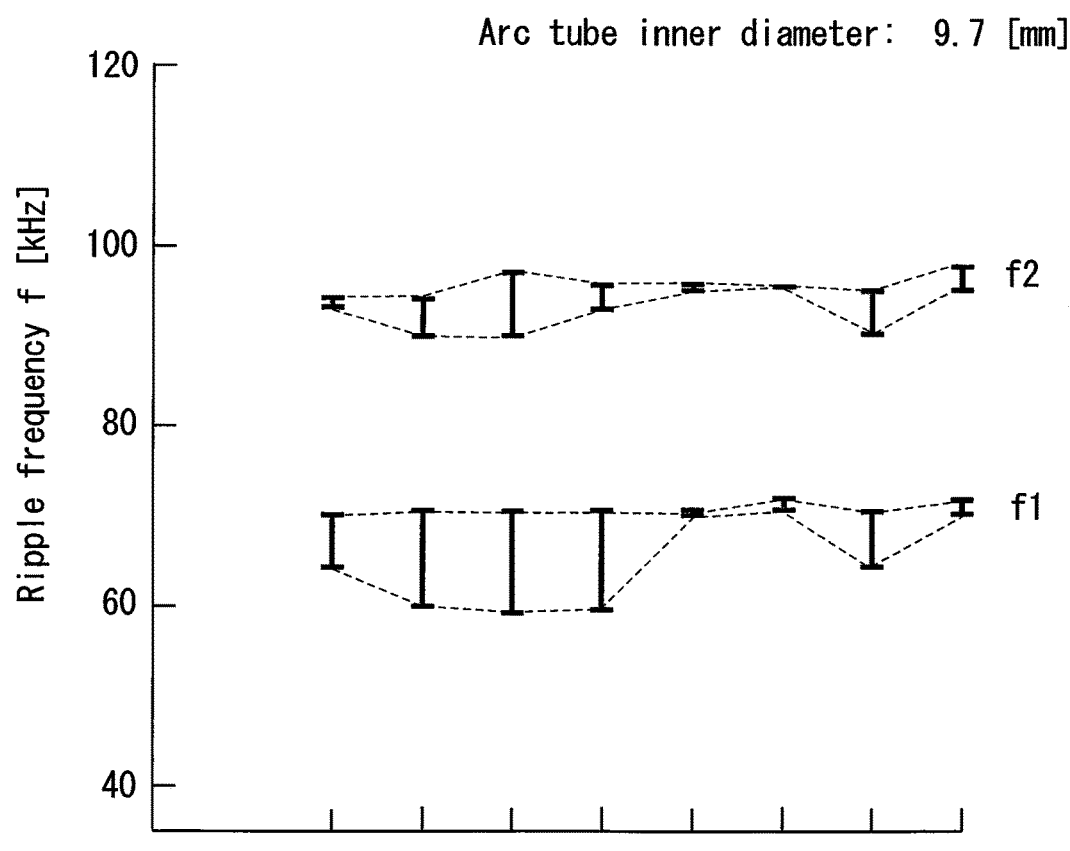
FIG. 3B is a graph showing a relationship between various kinds of parameters and the ripple frequency of a high-pressure sodium lamp using an arc tube inner diameter 9.7 mm.

Similarly, the FIG. 3B relates to a high-pressure sodium lamp with the arc tube inner diameter D=9.7 mm, and shows the result of preparing eight samples to measure the ripple frequency kHz at which the acoustic resonance phenomenon occurs.

Regarding the charged pressure of Xe, a sample No. 11 has 250 Torr, Nos. 12 to 16 have 300 Torr, No. 17 has 400 Torr, and No. 18 has 500 Torr. Regarding the arc length AL, the sample No. 11 to 13 have 145.8 mm, Nos. 14 to 15 have 144 mm, No. 16 has 145 mm, Nos. 17 has 145.8 mm, and No. 18 has 142.8 mm. Regarding the electrode type, the samples Nos. 11 to 13 have P0.8-8 W, Nos. 14 to 15 have P0.9-10E (electrode mandrel diameter 0.9 mm, total length 10 mm), No. 16 has P1.2-12E, No. 17 has P0.8-8 W, and No. 18 has P1.2-12E.

Based on the experimental results, it was found that the first acoustic resonance frequency f1 kHz occurs at 60 to 72 kHz with the arc tube inner diameter D=8.0 mm. Similarly, it was found that the second acoustic resonance frequency f2 kHz occurs at 90 to 100 kHz. Similarly, the phenomenon affecting the arc in the arc tube due to the third acoustic resonance frequency was not observed.

From the results in FIGS. 3A and 3B, no correlation of any one of differences in the charged pressure of xenon Xe, the arc length AL, and the electrode type with the presence or absence of the occurrence of acoustic frequencies was found. However, considering the results in FIGS. 3A and 3B, it was observed that occurrence bands of the first acoustic resonance frequency f1 kHz and the second acoustic resonance frequency f2 kHz are largely different.

Thus, lamps with varying arc tube inner diameters D mm of the high-pressure sodium lamp were made and a relationship with the ripple frequency was investigated. There are 4 types of arc tube inner diameters Dmm, 8.0, 9.0, 9.7, and 12.0. The other specifications are as follows.

Lamp: single base type 600 W lamp shown in FIG. 2A and both base type 1000 W lamp shown in FIG. 2B,
Xe charged pressure 250 to 500 Torr, and
lamp voltage VL: 150 to 400 V Table 1 is a table showing the relationship between the arc tube inner diameter D of the high-pressure sodium lamp and the ripple frequency.

| arc tube inner diamete D [mm] acoustic resonance occurrence band f [kHz] | | 8.0 | 9.0 | 9.7 | 12.0 |
|---|---|---|---|---|---|
| f2 | max. | 115 | 106 | 98 | 75 |
|  | min. | 109 | 101 | 90 | 64 |
| f1 | max. | 89 | 78 | 72 | 55 |
|  | min. | 80 | 70 | 59 | 50 |

Figure 4:
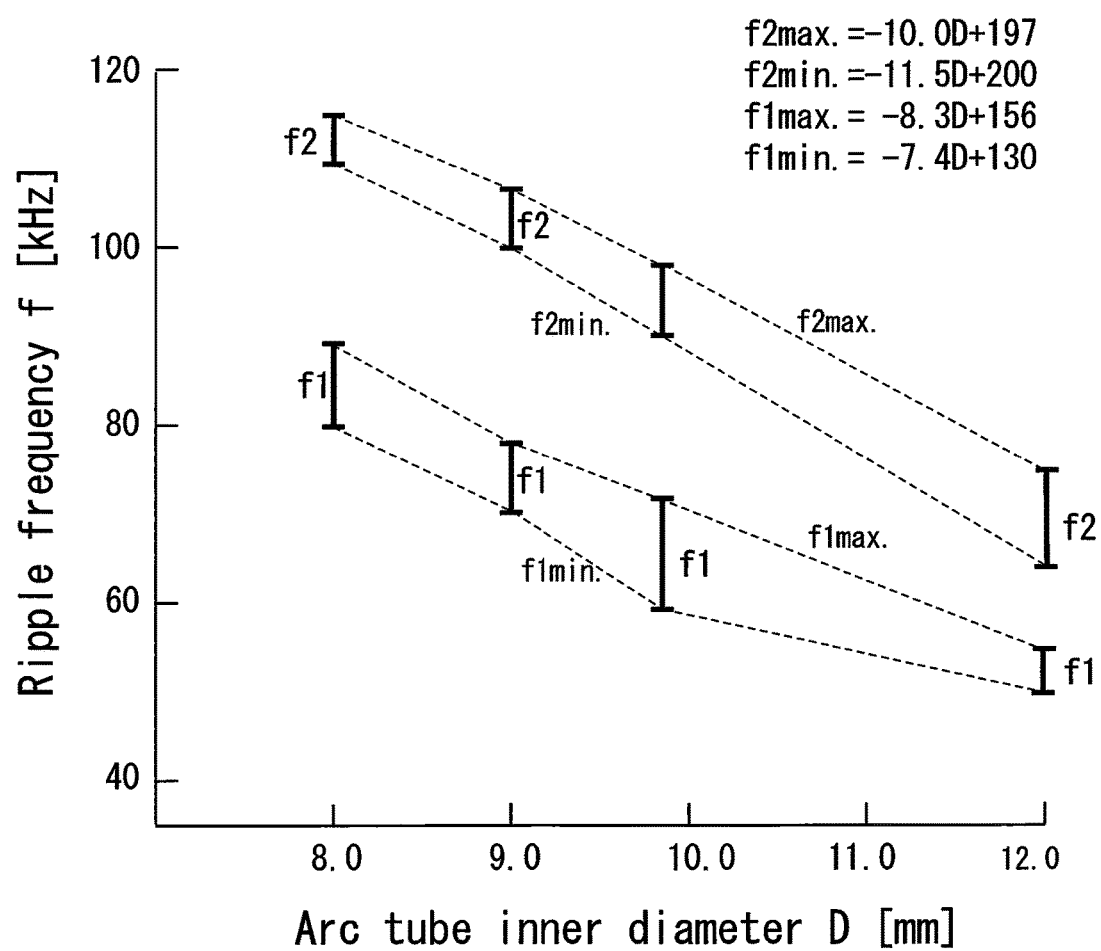
FIG. 4 is a graph showing a relationship between the arc tube inner diameter and the ripple frequency of the high-pressure sodium lamp.

FIG. 4 is a graph showing Table 1.

With the arc tube inner diameter D=8.0 mm, the first acoustic resonance occurrence band (f1min. to f1max.) was 80 to 89 kHz. The second acoustic resonance occurrence band (f2 min. to f2max.) was 109 to 115 kHz. For the result of other arc tube inner diameters D, see Table 1 and FIG. 4.

As shown in FIG. 4, it was found that there is a very close correlation between the arc tube inner diameter D and a band of the ripple frequency at which acoustic resonance occurs. From FIG. 4, it is found that a linear approximation can be applied to the relationship of each of the first acoustic resonance occurrence band f1 kHz and the second acoustic resonance occurrence band f2 kHz to the arc tube inner diameter D. Regarding the correlation between the arc tube inner diameter D and the first acoustic resonance occurrence band f1 kHz and second acoustic resonance occurrence band f2 kHz, the following equations were obtained.

$$f1\min.=-7.4D+130$$

$$f1\max.=-8.3D+156$$

$$f2\min.=-11.5D+200$$

$$f2\max.=-10.0D+197$$

where D: arc tube inner diameter mm

Therefore, when a high-pressure sodium lamp lighting device is designed, in order to reduce the occurrence of the acoustic resonance phenomenon, it is necessary to select the arc tube inner diameter D mm that avoids the first and second acoustic resonance occurrence bands f1 kHz and f2 kHz shown in (Equation 1) and (Equation 2).

First acoustic resonance occurrence band $f1: f1\min.$ to $f1\max.=(-7.4D+130)$ to $(-8.3D+156)$     (Eq. 1)

Where D: arc tube inner diameter mm

Second acoustic resonance occurrence band $f2$: $f2$ min. to $f2\text{max}.=(-11.5D+200)$ to $(-10.D+197)$ (Eq. 2)

Where D: arc tube inner diameter mm

Determining the arc tube inner diameter D mm in such a manner as to avoid the first and second acoustic resonance occurrence bands f1 kHz and f2 kHz in (Equation 1) and (Equation 2) allowed the occurrence of the acoustic resonance phenomenon to be reduced.

Second Embodiment

In the first embodiment, it was found that the occurrence of the acoustic resonance phenomenon can be reduced by the appropriate selection of the arc tube inner diameter D mm. However, an examination of characteristics of the electronic ballast shown in FIG. 1 showed that a lighting frequency f [kHz] varies depending on the lamp voltage VL [V] with the electronic ballast used in lighting equipment of some manufacturers. In "Gavita Pro 1000 DEUS" manufactured by GAVITA Company, which the present inventors used in the experiment, the lighting frequency f also increases as the lamp voltage VL increases. In general, since the lamp voltage of the high-pressure sodium lamp rises from the beginning to the end of the life span, in the lighting device using this type of ballast, the lighting frequency increases with a lapse of the lighting time. It should be noted that some electronic ballast is provided with compensation means so that the lighting frequency f becomes constant even if the lamp voltage VL changes.

Therefore, it was necessary to determine the lamp voltage VL so as to be capable of avoiding the first and second acoustic resonance occurrence bands f1 kHz and f2 kHz.

Figure 5A:
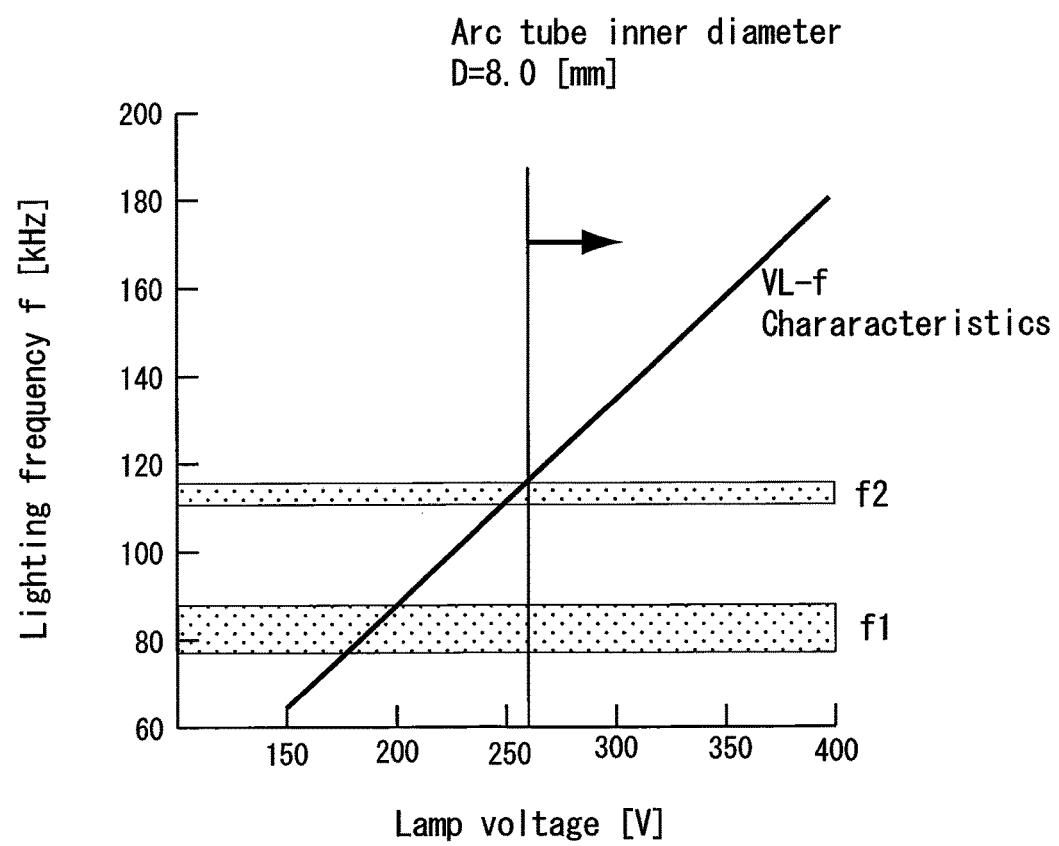
FIG. 5A is a graph showing a relationship between a lamp voltage and a lighting frequency of a high-pressure sodium lamp lighting device using an arc tube inner diameter 8.0 mm.

FIG. 5A is a graph showing a change when the lamp voltage VL is changed in the high-pressure sodium lamp lighting device using the arc tube inner diameter D=8.0 mm. The illustrated first and second acoustic resonance occurrence bands f1 kHz and f2 kHz are the frequency bands obtained by Equations (1) and (2).

The VL-f characteristics of the electronic ballast used are indicated by a solid line. The VL-f characteristics of the electronic ballast show that the lighting frequency f rises almost linearly from 65 to 180 kHz when the lamp voltage VL is in the range of 150 to 400 V.

In such a case, it is necessary to select a lamp voltage VL exceeding a maximum value of the second acoustic resonance occurrence band f2max. In the case of FIG. 5A, the lamp voltage VL must be set in the range of 270 to 400 V. Furthermore, considering that the lamp voltage rises by the end of a lamp life, it is preferable to set the lamp voltage as low as possible in a range exceeding f2max.

Figure 5B:
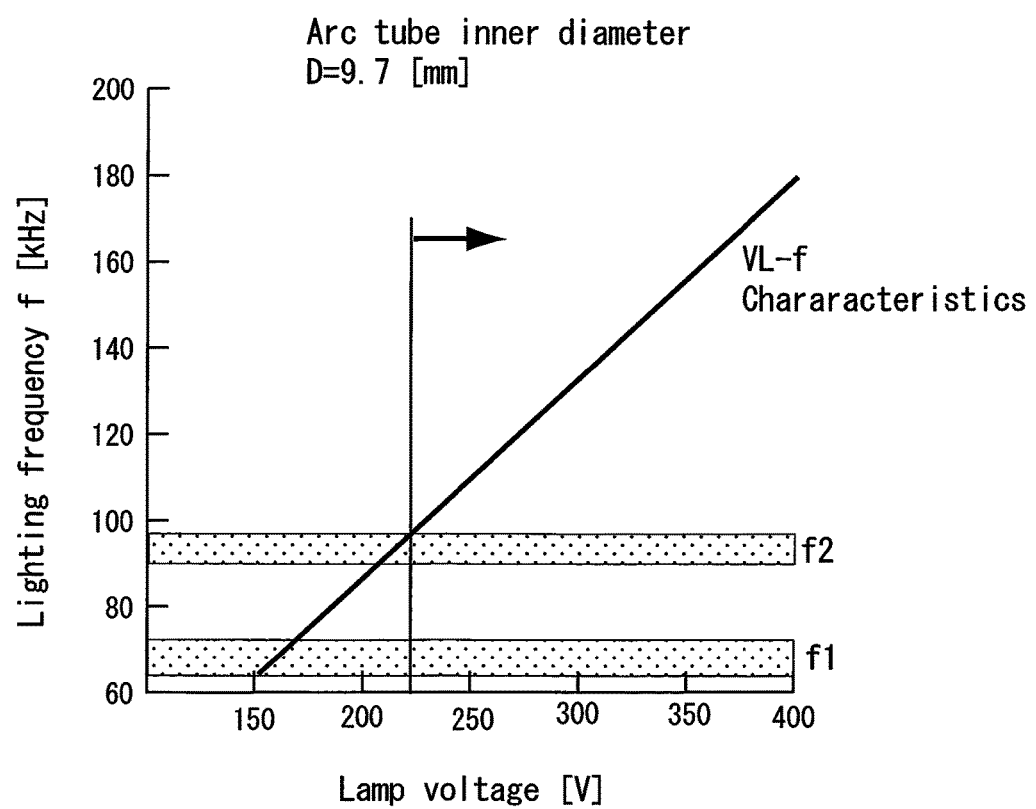
FIG. 5B is a graph showing a relationship between a lamp voltage and a lighting frequency of a high-pressure sodium lamp lighting device using an arc tube inner diameter 9.7 mm.

Similarly, FIG. 5B shows the case where the arc tube inner diameter D=9.7 mm is used. The VL-f characteristics of the electronic ballast used are the same as those in FIG. 5A. However, as described in the first embodiment, the first and second acoustic resonance occurrence bands f1 kHz and f2 kHz are different.

In such a case, it is necessary to select a lamp voltage VL exceeding the maximum value of the second acoustic resonance occurrence band f2max. In the case of FIG. 5B, the lamp voltage VL must be set in the range of 220 to 400 V.

After all, in order to obtain the lamp voltage VL, it is necessary that the VL-f characteristics of the electronic ballast to be used is examined, the first and second acoustic resonance occurrence bands f1 kHz and f2 kHz are determined according to the first embodiment, and the lamp voltage VL is determined to exceed the maximum value f2max. of the second acoustic resonance occurrence band.

According to the second embodiment, the occurrence of an acoustic resonance phenomenon can be reduced even when the lighting frequency f changes depending on the lamp voltage VL in the electronic ballast to be used.

Work Flows of First and Second Embodiments

Figure 6A:
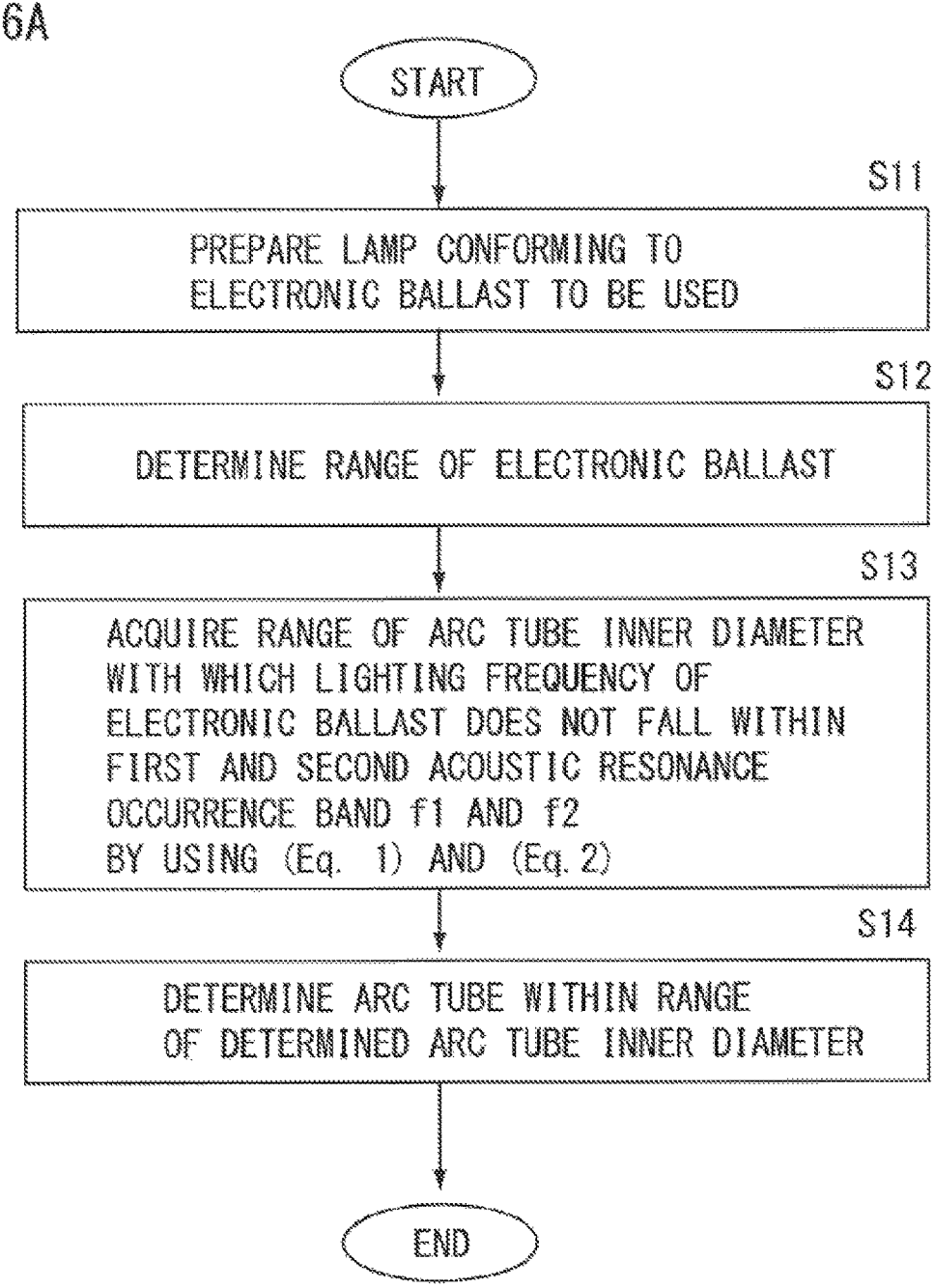
FIG. 6A is a diagram showing a work flow of a first embodiment.

FIG. 6A is a diagram showing a work flow of the first embodiment.

In step S11, a lamp conforming to the electronic ballast to be used is prepared. This lamp may be any lamp as long as it is a lamp that can be lit with lamp power suitable for the use of the electronic ballast.

In step S12, the lamp voltage VL is changed when the lamp is lit, so that the lighting frequency characteristics VL-f of the electronic ballast are acquired.

In step S13, by using (Equation 1) and (Equation 2), the range of the arc tube inner diameter with which the lighting frequency of the ballast does not fall within the range of the first and second acoustic resonance frequency bands f1 kHz and f2 kHz is acquired.

In step S14, an arc tube is created within the range of the acquired arc tube inner diameter.

Figure 6B:
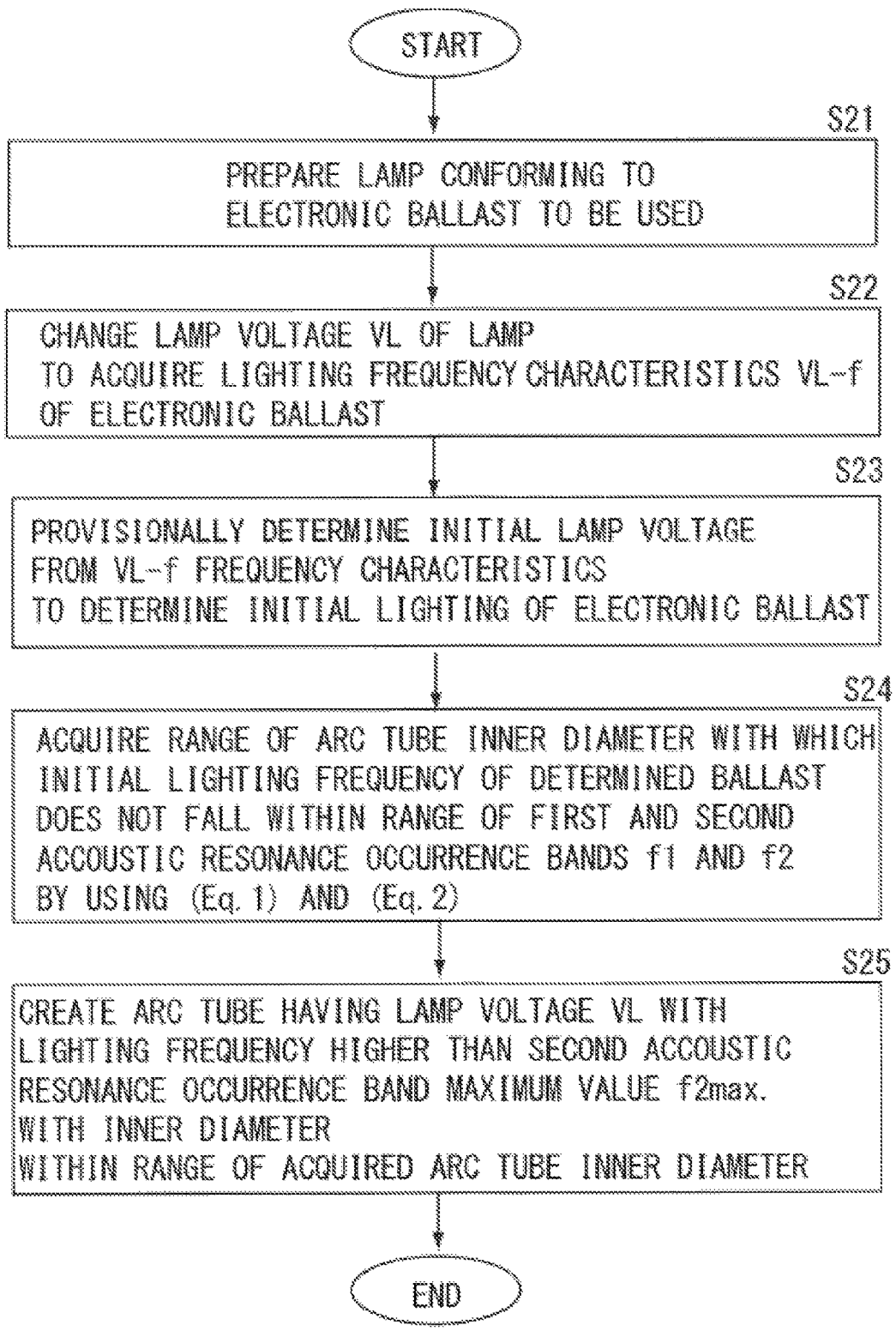
FIG. 6B is a diagram showing a work flow of a second embodiment.

FIG. 6B is a diagram showing a work flow of the second embodiment.

In step S21, similarly to step S11, a lamp conforming to the electronic ballast to be used is prepared. This lamp may be any lamp as long as it is a lamp that can be lit with lamp power suitable for the use of the electronic ballast.

In step S22, similarly to step S12, the lamp voltage VL is changed when the lamp is lit, so that the lighting frequency characteristics VL-f of the electronic ballast are acquired.

In step S23, the initial lamp voltage is provisionally determined from the acquired lamp voltage–lighting frequency characteristics VL-f, so that the initial lighting frequency of the electronic ballast is determined.

In step S24, by using (Equation 1) and (Equation 2), a range of the arc tube inner diameter where the initial lighting frequency of the determined electronic ballast does not fall within the range of the first and second acoustic resonance occurrence bands f1 kHz and f2 kHz is acquired.

In step S25, a lamp having a lamp voltage VL with a lighting frequency higher than the second acoustic resonance occurrence band maximum value f2max. with the inner diameter within the range of acquired arc tube inner diameter is created.

Advantages and Effects of Present Embodiment (1) Both the electronic ballast and the high-pressure sodium lamp lighting device used in the present embodiment are available on the market, and a lighting device for reducing the occurrence of an acoustic resonance phenomenon can be accomplished by using them.

(2) The present embodiment relates to a high-pressure sodium lamp having a cylindrical shape and was accomplished based on the discovery that the presence or absence of the occurrence of an acoustic resonance phenomenon depends on the function of only the arc tube inner diameter D. Based on this discovery, a lighting device for reducing the occurrence of an acoustic resonance phenomenon could be accomplished.

Modification and the Like

Although embodiments of the high-pressure sodium lamp lighting device according to the present invention are described above, these are illustrative and do not limit the scope of the present invention at all. With respect to the present embodiment, additions, deletions, modifications, deletions, improvements, and the like that can be easily made by those skilled in the art are within the scope of the present invention. The technical scope of the present invention is determined based on the description of the attached claims.

The invention claimed is:

1. A high-pressure sodium lamp lighting device, comprising:
   a high-pressure sodium lamp; and
   electronic ballast configured to supply a high frequency AC voltage to the high-pressure sodium lamp; wherein:
   said high-pressure sodium lamp is of arc length AL within the scope of 142.8 mm≤AL≤167 mm;
   a lighting frequency of said electronic ballast is a frequency that does not fall within a first and a second acoustic resonance occurrence bands f1 kHz and f2 kHz, respectively, determined based on a first equation (Equation 1) and a second equation (Equation 2) from an arc tube inner diameter D mm of the high-pressure sodium lamp;
   Equation 1 for the first acoustic resonance occurrence band f1 kHz is f1min to f1max=(−7.4 D+130) to (−8.3 D+156),
   Equation 2 for the second acoustic resonance occurrence band f2 kHz is f2 min to f2max=(−11.5 D+200) to (−10.0 D+197); and
   said electronic ballast wherein the lighting frequency f [kHz] varies depending on a lamp voltage VL [V] with the electronic ballast, the lighting frequency of the electronic ballast is a value exceeding a maximum value of the second acoustic resonance occurrence band f2max, determined based on (Equation 2) from the arc tube inner diameter D, in millimeters, of the high-pressure sodium lamp of lamp voltage—lighting frequency characteristics VL-f of the electronic ballast.

2. A method for reducing an acoustic resonance phenomenon of a high-pressure sodium lamp lighting device fed with a high frequency AC voltage from an electronic ballast, the method comprising the steps of:
   preparing a lamp of arc length AL within the scope of 142.8 mm≤AL≤167 mm, conforming to the electronic ballast;
   changing a lamp voltage VL when the lamp is lit to acquire lighting frequency characteristics VL-f of the electronic ballast, the electronic ballast wherein a lighting frequency f [kHz] varies depending on the lamp voltage;
   provisionally determining an initial lamp voltage from the lamp voltage—lighting frequency characteristics VL-f to determine an initial lighting frequency of the electronic ballast,
   acquiring a range of an arc tube inner diameter with which the initial lighting frequency does not fall within a range of a first and a second acoustic resonance occurrence bands f1 kHz and f2 kHz, respectively, by using a first equation (Equation 1) and a second equation (Equation 2), and
   creating a lamp having a lamp voltage VL with a lighting frequency higher than a second acoustic resonance occurrence band maximum value f2max, with an inner diameter within a range of an acquired arc tube inner diameter to operate the high-pressure sodium lamp lighting device,
   wherein Equation 1 for the first acoustic resonance occurrence band f1 kHz is f1min to f1max=(−7.4 D+130) to (−8.3 D+156),
   wherein Equation 2 for the second acoustic resonance occurrence band f2 kHz is f2 min to f2max=(−11.5 D+200) to (−10.0 D+197)); and
   wherein D is the arc tube inner diameter in millimeters.

* * * * *